Sept. 25, 1934.  H. N. MAY  1,974,663
EXTRUSION CHAMBER
Filed July 9, 1932
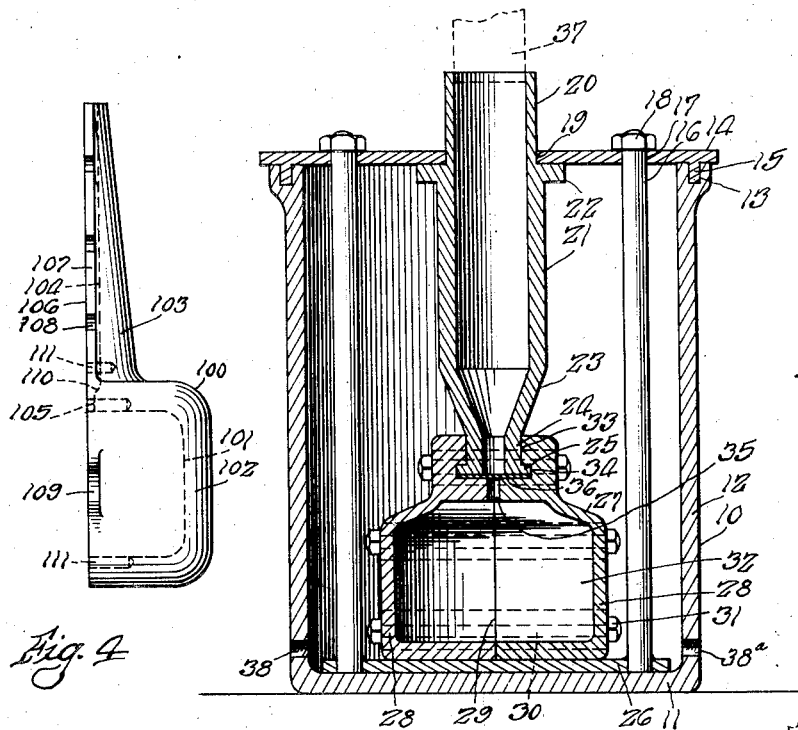
Fig. 1
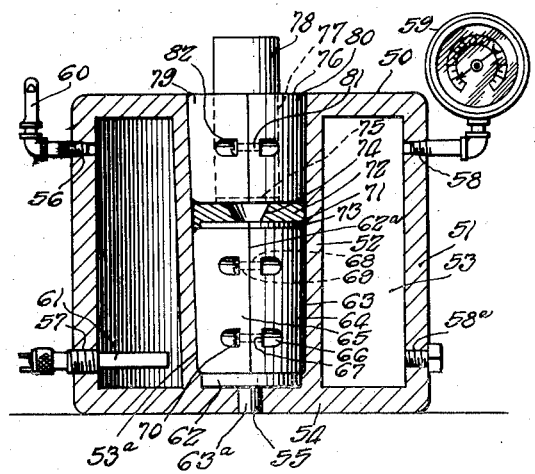
Fig. 2
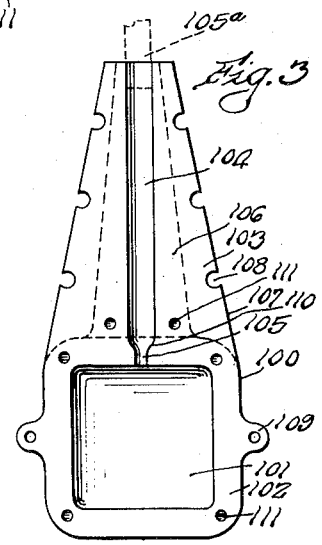
Fig. 3
Fig. 4
Inventor:
Harold N. May Patented Sept. 25, 1934

1,974,663

UNITED STATES PATENT OFFICE 1,974,663

EXTRUSION CHAMBER

Harold N. May, Chicago, Ill.

Application July 9, 1932, Serial No. 621,605

2 Claims. (Cl. 18—30)

This invention has to do with a dental flask adapted to receive, while closed, a denture material in a plastic form, and relates particularly to a device for depositing a denture material into said flask in such a form.

A mold for the reception and forming of a denture is ordinarily made in two or more parts. Such parts taken together are called a flask. Molding material, usually a form of gypsum, is contained within the flask, there being a cavity within the molding material which may be formed by removing a positive replica of the patient's gums which has been previously imbedded therein. A cavity thus formed is for the reception of a denture material which is received in a plastic form and held until the denture material becomes hard to form a denture in the form of the said positive replica. The molding material is of a character to become quite hard when set and the part in the two halves of the flask is separated at a plane intersecting the cavity at a selected section.

A flask thus prepared may have its parts opened to expose a section of the cavity in the hardened molding material of either part.

In common practice a flask prepared in the manner above described is opened and a denture material is placed between the two cavity sections and inserted therein as far as the cavity contour will permit. The two flask parts are then pressed into a closed position while the denture material is heated to make it plastic so that it will flow or press into the intricate crevices of the cavity. In order to more completely compress the denture material about the base of teeth which may project into the cavity and into the complicated pockets or indentures therein, an exuberance of the material is used, the excess escaping as the flask approaches its closed position by way of openings provided in the molding material and flask.

When a denture is formed in this manner, extreme care must be had in forcing the two flask members together in order that the molding material forming the cavity will not be pressed excessively to be broken or to otherwise deform the cavity. Neither can the members of such a flask be forced together too slowly for it is possible for the denture material to become so soft as to lose its body and thus make it impossible to compress it into the more remote interstices of the cavity. Even to one who is experienced in the task, the operation of pressing the flask parts together to perfectly form a denture is an arduous one and always involves the element of uncertainty.

Among the objects of the present invention is the provision of:

A new process for positively depositing a denture within a mold therefor without danger of injuring such mold.

Improved means for heating a denture to a plastic condition anterior to forcing it into a dental flask.

A unique gate for allowing the discharge of a plastic denture material into a mold at a predetermined pressure.

A heat chest for communicating heat to a supply of denture material to maintain it in a plastic condition, and suitable to be used as a tempering oven for a molded denture.

A new form of heat chest adapted to receive both a compression chamber and a dental flask.

Means for first compressing a denture material which has been treated to attain a plastic condition and then forcing the compressed denture into a mold therefor.

These objects and other desirable objects are made apparent in the description which is hereinafter set forth with reference to the accompanying drawing which is hereby made a part of this specification and in which:

Figure 1 is a sectional view of one form of the device taken in elevation;

Figure 2 shows a different form of the invention taken in central elevation;

Figure 3 is a member comprising one-half of a form of the invention; and

Figure 4 is a different view of the member shown in Figure 3 and taken in side elevation.

Like reference characters are used to designate similar parts in the drawing and in the description of the invention which follows.

In Figure 1, there is shown a chamber 10 having a bottom 11 and side walls 12. The chamber 10 is preferably cast or otherwise shaped in a single piece, the bottom being circular and the walls 12 cylindrical. A groove 13 is formed within the upper end of the walls 12. For seating upon the top of the walls 12 is a circular plate 14 for closing the chamber 10. Projecting downwardly from the cover plate 14 is a circular flange 15 of a diameter and cross section to seat closely within the groove 13 when the cover is in place.

Projecting downwardly from the cover plate 14 into the chamber there may be any number of rods 16. Apertures 17 within the cover plate accommodate the rods 16 and the upper ends of the rods may be threaded to receive nuts 18 for holding the rods in place.

Means may be used for holding the cover plate 14 in place, such as by providing a flange about the top of the walls 12 and placing apertures in the flange and in the cover plate for the common reception of bolts.

Centrally placed within the cover plate 14 is an opening 19 into which are inserted the upper walls 20 of a compression chamber 21. The outer periphery of the walls 20 exactly fit within the aperture 19 so as to provide a tight joint between the compression chamber and the cover plate. A flange 22 circumscribes the compression chamber 21. The walls comprising the lower part of the compression chamber 21 may converge downwardly at 23 into a neck 24. The lower walls of the compression chamber can be straight if desired. Flush with the neck 24 at its lower end is a flange 25.

There may be placed adjacent to the bottom 11 of the chamber a plate 26. The plate 26 is suspended from the rods 16 to which it is solidly attached. Resting upon the plate 26 shown in Figure 1 is a dental flask 27. The flask 27 is symmetrically constructed and comprises two identical and complemental elements 28. When the walls and bottom of the chamber 10 are made heavy enough, the flask 27 may be supported entirely by the chamber bottom and the rods 16 and the plate 26 eliminated from the construction. Members 28 are somewhat cup-shaped, the walls of each thereof terminating at 29 within a plane. Within the walls of the two members 28 may be apertures 30 for the common reception of bolts 31 whereby the two members may be held in a closed position. Instead of the walls of the flask members being apertured, there may be apertured ears thereon for the reception of bolts for holding the two members together. A cavity 32 is formed within the flask when the two members 28 are in the closed position. The walls forming the top of the flask 27 are thicker than the lower and side walls thereof, there being a recess 33 within the top walls. The recess 33 is preferably circular.

A groove 34 also circular is formed within the lower edge of the walls of the recess. In the bottom of the recess 33 and co-formed within the two elements 28 of the dental flask is an aperture 35. The aperture may be of any selected cross section. The neck 24 and the flange 25 of the compression chamber 21 are enclosed within the recess 33 and the groove 34 respectively pursuant with assembling the flask 27 and before the bolts 31 have the nuts tightened thereon. The plate 26 beneath the flask is of such a thickness that the lower parts of the compression chamber 21 will properly engage the recess 33 and the groove 34. A tight fit is had between the lower end of the compression chamber and the flask 27 so that a material may be forced from the compression chamber into the flask in a manner hereinafter to be explained.

It is to be understood that any means for effecting a tight fit between the compression chamber and the flask will suffice and the invention is not to be limited to the specific construction shown.

For closing the aperture 35 leading into the dental flask 27 there may be a thin disk 36 which is held tightly between the lower end of the compression chamber 21 and the bottom of the recess 33. The disk 37 may be scored at a point or points registering with the recess 35 to be there weakened so that the disk will be ruptured at that section or sections when sufficient pressure is applied thereto.

Shown schematically at the upper end of the compression chamber 21 is a piston 37. Means (not shown) for forcing the piston 37 downwardly into the compression chamber 21 may consist of a hydraulic jack such as is commonly used in the manufacture of dentures and for pressing flask parts together. If desired, there may be provided threads to an end plate for covering the compression chamber 21 to cooperate with a threaded stem upon the upper end of the piston 37 so that the piston may be forced downwardly into the compression chamber 21 by hand.

Anterior to placing the dental flask 27 into the chamber 10 and into assembly with the compression chamber 21 in the manner shown in Figure 1, such flask is filled with a molding material having a cavity therein in the shape of the denture to be formed. This cavity in the molding material is formed in the manner which has long been common practice in the manufacture of dentures. Leading from the cavity within the molding material to the aperture 35 will be a gate or gates so that a denture material which has been heated to a plastic state may be forced through the aperture 35 and such gate or gates into the cavity within the molding material. Subsequent to the placing of the flask 27 and the compression chamber 21 into assembly with the outer jacket 10 the interior of the jacket and hence the compression chamber and the flask are heated. Thereafter the chamber 21 is partially filled with a denture material. The piston 37 is then advanced downwardly into the compression chamber 21 so as to prevent the escape of heat from within the chamber. Heat is developed within the outer jacket or chamber 10 in any desirable manner, such as by forcing steam through the jacket by means of apertures 38 and 38a. An electrical heating element may be placed internally or externally of the jacket 10, or the jacket may be subjected directly to a flame. The heat source is immaterial. Such temperature is developed within the jacket as is necessary to heat the denture material which is within the compression chamber 21 to a plastic or semi-fluid state. Simultaneously, the dental flask 27 is heated.

When the denture material has been pressed and heated sufficiently to be of a semi-liquid or plastic form the piston 37 is advanced downwardly into the chamber 21 to further compress the denture material against the disk 36. The disk 36 is of a strength to provide that considerable pressure may be applied to the denture material in order to increase the density of that material and to break down any voids or air holes that might have formed within the material while it was being softened. After the denture material has been so compressed, the pressure is increased to such a degree as is necessary to break the disk 36 and to exude the plastic material through the orifice or orifices caused by the breaking of the disk and into the cavity within the molding material by way of the opening 35 and the heretofore mentioned gate or gates in the molding material.

The pressure within the compression chamber 21 may be maintained or even increased to force the denture material into the cavity within the dental flask by simply advancing the plunger 37 further downwardly into the compression chamber. Because of the soft and pliable character of the charge of the denture material when it is forced into the cavity formed within the molding material within the dental flask 27, all likelihood of injuring delicately formed parts of the cavity walls is obviated.

When a denture is formed in the contemporary manner, all of the pressure available for forcing the softened denture material into the intricate parts of the cavity formed within the molding material is expended at the time the two flask parts are brought together. In the present device the pressure for forcing the denture material into the more remote parts of the cavity for receiving the material may be constantly maintained or increased at will.

After the denture has been deposited within the dental flask the flask may be left within the jacket and the heat within the jacket and flask be increased for the purpose of curing certain types of dentures. Certain types of dentures do not require the increased heat treatment. After the heat supply has been cut off the flask may be left within the jacket to cool more slowly if the material of the denture be of the type requiring slow cooling to be properly tempered, or the flask may, if desired, be immediately taken from the jacket 12 and allowed to cool more rapidly.

A different form of the invention is shown in Figure 2. In that figure there is a jacket 50 having exterior walls 51 and the interior walls 52. The jacket 50 will usually be cylindrical in shape although it may be in other shapes. Intermediate the walls 51 and 52 is an annular chamber 53 which surrounds the walls 52. Enclosed by the walls 52 is a recess 53a, the walls 52 converging slightly as the bottom of the recess is approached. Within the bottom 54 of the jacket 50 and of the recess 53a is a hole 55. In the outer wall 51 of the jacket 50 are threaded apertures 56, 57, 58 and 58a, or more if desired.

The jacket 50 adapts the chamber 53 to receive steam or a heated gas for heating the parts received by the recess 53a. A pressure gauge 59 is inserted within the aperture 58 for indicating the pressure of the steam or gas within the chamber 53. A safety valve 60 is connected to the chamber 53 by means of the threaded aperture 56. The aperture 57 is for the accommodation of a heating element 61. The element 61 may be of the type for energization from an electric source, its function being to heat water which has been placed within the chamber 53 for generating steam. The method employed for heating the chamber is immaterial. A flame may be applied to the exterior of the jacket 51 if desired. If an external source is available for steam, there may be inserted into the aperture 57 instead of the heating element 61 a nozzle arrangement for injecting steam into the chamber. The aperture 58a may function either as an outlet for circulating steam through the chamber or an outlet for draining water from the chamber or both.

Seated within the bottom of the recess 53a is a flat plate 62 having a boss 63a thereon for projecting into the hole 55. Resting upon the plate 62 is a dental flask 63 having parts 64 and 65 enjoining one another along the faces 62a of the walls thereof common to a single plane. The flask 63 is substantially cylindrical in shape, it being tapered slightly so that it will fit snugly into the tapered walls of the recess 53a. The two elements 64 and 65 are each in the shape of a half cylinder, the halves engaging one another along a plane cutting the cylinder along its principal axis. At either side of the flask element 64 are countersunk sections 66 to provide faces 67 parallel to the faces 62a at the vertical edges thereof. Between the face 67 and the face 62a an aperture 68 is drilled and tapped. For co-acting with the apertures 68 there are formed threaded apertures 69 within the opposed flask element 65, in much the same manner as are the apertures 68 provided. Screws 70 are inserted through the apertures 69 and screwed into the threaded apertures 68 for holding the two flask members together. The top of the flask 63 has a circular shoulder 71. Centrally placed within the top of the flask 63 is an aperture (not shown) similar to the aperture 35 in the flask shown in Figure 1.

Resting upon the top of the flask 63 is a circular plate 72 having a circular boss 73 for fitting into the notch formed at the top of the flask by the shoulder 71. The boss 73 when telescoped about the top of the flask elements 64 and 65 assists in holding the two elements together. The plate 72 is optional and may be eliminated, in which case a compression chamber 76, later to be described, seats directly upon the flask 63.

Registering with the aperture (not shown) in the top of the flask 63 is an aperture 74 within the plate 72. Covering the aperture 74 is a thin disk 75 which is preferably of metal, and which may be weakened at a desired point by having depressions or grooves placed therein. Above the plate 72 and the disk 75 and within the recess 53a is a compression chamber 76. The chamber 76 is cylindrical and has a central bore 77 for the reception of a plunger 78.

Two identical elements 79 and 80 comprise the compression chamber 76. Sections 81 within the walls of the elements 79 and 80 are suitably apertured and threaded to co-receive screws 82 for holding the two members together. The compression chamber 76 may of course be formed of a single piece if desired. The lower end of the walls of the compression chamber 76 are chamfered for engaging the edges of the disk 75 for holding such disk in proper position over the opening 74 within the plate 72.

Before the dental flask 63 is placed within the recess 53a upon the plate 62 it is prepared with a molding material to form a cavity into which a denture material is to be deposited for forming the denture. The gate (or gates) leads from the cavity within the molding material to the aperture (not shown) within the top of the dental flask and registering with the opening 74 within the plate 72.

Subsequently to the placing of the flask 63, the plate 72, the disk 75 and the compression chamber 76 into the recess 53a, the chamber 53 and the parts placed within the recess 53a are heated and the denture material is then placed within the compression chamber and the plunger 78 inserted within the upper end of the bore 77. The heat is developed within the chamber 53 by heating water which has been placed within such chamber. Heating of the water to produce steam is accomplished by means of the heating element 61. Any other convenient source of steam or heated gas may be used for raising the temperature within the chamber 53. Heat from the chamber 53 is conducted by the interior walls of the jacket 50 to the dental flask and to the compression chamber 76 for softening the denture material which has been placed therein.

After the denture material has been changed to a softened or plastic condition, the plunger 78 is advanced in any standard manner to further compress such material against the disk 75.

Pressure is developed in the compression chamber 65 of such a magnitude as to eventually break the disk 75 to allow the denture material to escape through the opening thereby made within the disk downwardly and into the cavity within the molding material by way of the opening 74, the opening within the top of the dental flask and the gate (or gates) through the molding material leading to the cavity for the deposit of the denture material.

Before the disk 75 is broken there is sufficient pressure upon the plastic denture material within the compression chamber 76 to remove all voids or air holes which might have been formed within that material during the softening process. Pressure may be maintained for urging the plastic denture material into the cavity within the dental flask in this form of the invention as above described in connection with the previous described form of the invention set forth in this specification. After the cavity within the flask is filled with the denture material, the temperature within the device may be increased or decreased, as part of the curing process of the denture depending upon the character of the denture material. Thereafter the heat supply may be cut off from the device so that the denture within the flask may be cooled and further tempered in the manner desired. If a slow cooling process is desired for the type of denture material exuded into the cavity, then the flask will be allowed to remain within the recess 53a while it is cooling. Should the denture material be of a type which is desired to be cooled more rapidly, the flask 63 and the parts thereabove within the recess 53a may be removed from such recess by using an instrument for rapping against the lug 63a. In this manner the parts closely set within the recess 53a are loosened from the recess walls.

A still different form of the invention is illustrated in Figures 3 and 4. In these two figures is shown a member which forms one-half of an extrusion flask. Two members 100, of which one is shown in the Figures 3 and 4, each configure within the lower body 102 thereof a concavity 101. The lower body 102 of the member 100 is analogous to one member of the dental flask proper of either of the two forms of the invention already described, the concavity 101 forming a section of a flask interior.

Extending upwardly from the lower body 102 of each element 100 of the device is a neck 103 containing a channel 104 which communicates to the concavity 101 through a partially constricted section 105. The neck 103 and the channel 104 serve as a compression chamber in which a denture material may be placed anterior to being heated to a plastic state and being forced into the flask or cavity 101 by a plunger 105a.

Along either side of the neck 103 and flush with the flat face 106 of each of the elements 100 are flanges 107 which are traversed by grooves 108 normal to the body thereof. When two of such members 100 are placed flatly together by abutting the faces 106, the grooves 108 of each member register with like grooves within the other member for the co-reception of bolts or other suitable clamping means for holding the two members together. The lower bodies 102 of the two members may be held together by means of bolts inserted in ears 109 and (or) apertures 111.

Subsequent to securing the two members 100 together and placing the resulting extrusion flask into a jacket, such as the jacket in Figure 1 and for heating, the channel 104 may be charged with a denture material which may be broken down into shreds, chips, small granule-like pieces or powder, or it may be charged with a previously compressed cartridge of the material which conforms substantially to the walls of the channel. Usually when the channel is charged with the small pieces of the material a disk not unlike that already described in connection with the other forms of the device will be placed at the shoulder 110 between the aperture at 105 and the channel 104 for holding such material within the channel until it has been broken down by heating and compressed by the plunger 105a. If a compressed cartridge of the material be used such a disk above the aperture 105 may be eliminated, the cartridge suspending itself within the walls of the channel 104 until it has been heated sufficiently to reach a plastic state.

Part of the process of forming a denture is the compressing of the denture material concurrently with the shaping thereof. Especially is it necessary to so compress celluloid and most pyroxylin materials in order that their molecular interfabrication will become that which tends to maintain the denture in the desired formation.

When a denture material is compressed in the conventional dental flask pursuant to closing the flask parts in the manner hereinabove described, there is danger of injuring projecting parts of the molding material which forms the cavity walls for those parts are not pressed with equal force on all sides by the material. Consequently the maximum pressure which may be applied to the denture is limited to a relatively small figure.

In the present device the denture material is deposited in every section of the denture cavity and over the entire cavity wall surface before any appreciable pressure is built up within the cavity, so that when the pressure is built up there will be equal pressure upon all sections of the cavity walls. This makes it possible to subject the denture to a greater pressure without injury to the cavity walls, and further provide a denture of uniform structure because equal pressure will have been applied to all sections thereof.

The device has been shown in its preferred embodiments, and as a fabrication of sundry parts. By constructing the device from a multiple of parts it can be easily dis-assembled so that its parts may be thoroughly cleaned. It is not necessary however, that the construction be one of fabricated parts, (with the exception of the flask proper) since the primary object of the device is to provide a compression chamber in which a denture material may be heated and compressed and forced into a cavity in the shape of a denture. Also departure from the use of a thin rupturable disk as a valve between the compression chamber and the flask is not prohibited, it being conceivable that any type of valve which can be opened at the crucial time will suffice with equal efficacy. Neither does the applicant wish to limit the construction for holding a disk between a compression chamber and a dental flask strictly to that illustrated in the drawing, for such a disk may be as effective if it be supported at any section within or at an end of a channel between the source of the denture material and the cavity within a dental flask.

What is claimed as new and is desired to be secured by Letters Patent of the United States is:

1. In combination, a dental flask, a member having a compression chamber, there being complemental openings in said flask and member, said openings being in registry one with another and being sealed by a single rupturable membrane, and means for increasing the pressure in the compression chamber in said member to rupture said membrane and discharge the contents of said chamber into said flask.

2. In combination, a dental flask, a member comprising a body having a compression chamber therein, a plate intermediate said flask and compression chamber member, there being complemental openings in said flask, member and plate, the openings in said flask, compression chamber member, and plate being in registry one with another, a single rupturable membrane for sealing said several openings, a casing comprising a double walled jacket, one of said walls being shaped to receive said flask, said plate and said compression chamber in assembled relation, said jacket being adapted to receive and hold a heating medium, and means for increasing the pressure in the compression chamber in said member to rupture said membrane and discharge the contents of said chamber into said flask.

HAROLD N. MAY.